US012730945B2

(12) United States Patent
Sevastyanov et al.

(10) Patent No.: US 12,730,945 B2
(45) Date of Patent: Sep. 8, 2026

(54) FEATURE SELECTION METHOD AND SYSTEM FOR REGRESSION ANALYSIS / MODEL CONSTRUCTION

(71) Applicant: AT&T Intellectual Property I, L.P., Atlanta, GA (US)

(72) Inventors: Vladimir Sevastyanov, Fort Worth, TX (US); Abhay Dabholkar, Allen, TX (US); Rakhi Gupta, Frisco, TX (US); James H. Pratt, Round Rock, TX (US); Nikhlesh Agrawal, McKinney, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1149 days.

(21) Appl. No.: 17/736,613

(22) Filed: May 4, 2022

(65) Prior Publication Data

US 2023/0359781 A1 Nov. 9, 2023

(51) Int. Cl.
*G06F 30/20* (2020.01)
*G06F 111/10* (2020.01)

(52) U.S. Cl.
CPC .......... *G06F 30/20* (2020.01); *G06F 2111/10* (2020.01)

(58) Field of Classification Search
CPC ............................ G06F 30/20; G06F 2111/10
USPC ............................................................ 703/6
See application file for complete search history.

(56) References Cited

U.S. PATENT DOCUMENTS

| | | | | |
|---|---|---|---|---|
| 7,970,718 | B2 * | 6/2011 | Guyon | G16B 40/00 706/15 |
| 8,190,537 | B1 * | 5/2012 | Singh | G06N 20/00 706/12 |
| 9,189,750 | B1 * | 11/2015 | Narsky | G06F 16/285 |
| 9,471,871 | B2 * | 10/2016 | Bruillard | G06N 20/00 |
| 10,452,793 | B2 * | 10/2019 | Joshi | G06N 5/045 |
| 11,257,000 | B2 * | 2/2022 | Mathew | H04W 4/021 |
| 11,429,899 | B2 * | 8/2022 | Kartoun | G06N 20/00 |
| 11,444,926 | B1 * | 9/2022 | Gama | G06N 5/04 |
| 11,500,932 | B2 * | 11/2022 | Kulkarni | G06F 16/285 |
| 11,742,081 | B2 * | 8/2023 | Kartoun | G16H 50/70 705/2 |
| 11,899,650 | B2 * | 2/2024 | Havel | G06F 16/2365 |
| 12,112,261 | B2 * | 10/2024 | Partee | G05B 13/0265 |

(Continued)

OTHER PUBLICATIONS

Ting et al. (Efficient Learning and Feature Selection in High-Dimensional Regression, Neural Computation 22, 831-886 (2010)) (Year: 2010).*

(Continued)

*Primary Examiner* — Iftekhar A Khan
(74) *Attorney, Agent, or Firm* — Guntin & Gust, PLC; Bryan S. Latham

(57) ABSTRACT

Aspects of the subject disclosure may include, for example, dividing a feature range of a feature into a plurality of subsets that span the feature range, calculating an average target variable value for each subset of the plurality of subsets, resulting in a plurality of average target variable values, and estimating a measure of feature significance with respect to a target variable by determining a difference between a maximum average target variable value and a minimum average target variable value in the plurality of average target variable values. Other embodiments are disclosed.

20 Claims, 14 Drawing Sheets

(56) References Cited

U.S. PATENT DOCUMENTS

2011/0106735 A1* 5/2011 Weston .................. G06N 20/00 706/12
2012/0143799 A1* 6/2012 Wilson .................. G06F 18/211 706/12
2015/0242759 A1* 8/2015 Bruillard ................ G06N 20/00 706/13
2016/0026917 A1* 1/2016 Weisberg ................. G06N 7/01 706/46
2016/0171134 A1* 6/2016 Mirabella ............... G06F 16/23 703/1
2016/0224705 A1* 8/2016 Joshi ....................... G06F 30/20
2018/0128619 A1* 5/2018 Herberth ................. G01S 19/49
2018/0137219 A1* 5/2018 Goldfarb ................ G06N 3/126
2021/0182357 A1* 6/2021 Partee .................... G05B 17/02
2021/0231834 A1* 7/2021 Prochnow .............. G01V 20/00
2021/0365498 A1* 11/2021 Kulkarni ................. G06F 18/22
2022/0351004 A1* 11/2022 Kanter .................. G06F 18/285
2022/0374765 A1* 11/2022 Wu ................... G06F 16/24578
2023/0076592 A1* 3/2023 Pratt ....................... G06F 17/11
2023/0117925 A1* 4/2023 Havel ................. G06F 16/2365 707/687
2023/0205847 A1* 6/2023 Ackerman ............ G06F 18/231
2023/0359781 A1* 11/2023 Sevastyanov ........... G06F 30/20

OTHER PUBLICATIONS

Rendall et al. (Wide spectrum feature selection (WiSe) for regression model building, Computers and Chemical Engineering 121 (2019) 99-110) (Year: 2019).*

Guyon, Isabelle et al., "An Introduction to Variable and Feature Selection", Journal of Machine Learning Research, 2003, 26 pages.

* cited by examiner

WIRELESS ACCESS 120
122
124
124
126
MEDIA ACCESS 140
144
144
MEDIA TERMINAL 142
COMMUNICATIONS NETWORK 125
NE 154
NE 156
NE 150
NE 152
SWITCHING DEVICE 132
134
134
VOICE ACCESS 130
CONTENT SOURCES 175
ACCESS TERMINAL 112
BROADBAND ACCESS 110
114
114
100

| target_num | headcount |
|---|---|
| 95 | 61.5 |
| 75 | 64 |
| 107 | 73 |
| 131 | 79 |
| 69 | 79.8 |
| 74 | 81 |
| 196 | 81 |
| 70 | 85.6 |
| 92 | 97 |
| 103 | 104.33 |
| 54 | 105 |
| 166 | 113.57 |
| avg=109.3 | subinterval=61.6-113.57 |
| 161 | 113.86 |
| 102 | 116 |
| 120 | 117.19 |
| 134 | 119 |
| 154 | 122.43 |
| 118 | 123.08 |
| 184 | 128.78 |
| 120 | 136 |
| 99 | 137.96 |
| 170 | 139.5 |
| 98 | 141.14 |
| 109 | 141.8 |
| 108 | 151.7 |
| 85 | 153.91 |
| avg=125.1 | subinterval=113.86-153.91 |
| 249 | 155.5 |
| 29 | 160 |
| 73 | 165.88 |
| 85 | 171.8 |
| 226 | 179.5 |
| 151 | 184 |
| 201 | 191 |
| 61 | 206.67 |
| 185 | 215.29 |
| 293 | 216.67 |
| 110 | 220.5 |
| 103 | 231 |
| 245 | 240.13 |
| 174 | 254 |
| 163 | 258 |
| avg=156.5 | subinterval=155.5-258.0 |
| delta=156.5-109.3=47.2 | |

| categ_value | cur_target_avg | categ_count |
|---|---|---|
| 1 | 5.810 | 32761 |
| 2 | 11.440 | 80053 |
| 3 | 12.540 | 82926 |
| 4 | 12.680 | 81505 |
| 5 | 12.220 | 80898 |
| 6 | 10.940 | 79127 |
| 7 | 7.830 | 61963 |

290

290a 290b 290c 290d 290e

290f

290g

| var_name | var_type | delta | bin_count | delta_norm |
|---|---|---|---|---|
| sum_edw_duration | numeric | 325.69 | 27 | 1.00000 |
| sum_rmet_hours | numeric | 325.67 | 27 | 0.99994 |
| sum_msoc_duration | numeric | 325.45 | 26 | 0.99928 |
| den | integer | 244.21 | 13776 | 0.74985 |
| area_nm_turf | categorical | 190.00 | 9469 | 0.58339 |
| wire_ctr_clliz_cd | categorical | 148.00 | 9595 | 0.45443 |
| wire_ctr_cllia_cd | categorical | 121.00 | 1200 | 0.37152 |
| dsptch_seq_nbr | integer | 118.86 | 9 | 0.36494 |
| wire_center | integer | 108.52 | 4576 | 0.33321 |
| actl_strt_dt | integer | 63.10 | 1007 | 0.19375 |
| sub_dma | categorical | 52.59 | 178 | 0.16148 |
| area_nm_aoi | categorical | 52.40 | 96 | 0.16089 |
| job_district | categorical | 48.23 | 28 | 0.14808 |
| director | categorical | 48.23 | 28 | 0.14808 |
| sub_dma_headcount | numeric | 47.15 | 30 | 0.14479 |
| wr_sts_qlfctn | categorical | 44.00 | 59 | 0.13510 |
| dma | categorical | 40.39 | 132 | 0.12402 |
| city | categorical | 40.39 | 129 | 0.12402 |
| source_qualifier | categorical | 37.66 | 15 | 0.11563 |
| trbl_fnd_cd | numeric | 29.24 | 16 | 0.08977 |
| state | categorical | 17.39 | 40 | 0.05340 |
| measure | categorical | 14.48 | 3 | 0.04446 |
| measure_id | integer | 14.48 | 3 | 0.04446 |
| measure_name | categorical | 14.48 | 3 | 0.04446 |
| orig_measure_id | integer | 14.48 | 3 | 0.04446 |
| comp_can_dt | integer | 14.06 | 1004 | 0.04316 |
| sub_measure_id | integer | 11.02 | 4 | 0.03385 |
| citype | integer | 11.02 | 4 | 0.03385 |
| desig | categorical | 10.74 | 2 | 0.03296 |
| measureid | integer | 10.29 | 2 | 0.03161 |
| fim_transport | categorical | 10.29 | 2 | 0.03161 |
| drr | numeric | 9.95 | 11 | 0.03054 |
| fim_org | categorical | 9.56 | 3 | 0.02936 |
| caus_cd | numeric | 8.95 | 28 | 0.02748 |
| weekofyear | categorical | 7.83 | 144 | 0.02403 |
| region | categorical | 7.18 | 4 | 0.02203 |
| src_cd | categorical | 7.18 | 4 | 0.02203 |
| original_org | categorical | 7.17 | 3 | 0.02202 |
| rmet_org | categorical | 7.17 | 3 | 0.02202 |
| day_of_week | integer | 6.88 | 7 | 0.02112 |
| wrk_type | categorical | 6.72 | 2 | 0.02065 |
| month_year | integer | 5.64 | 33 | 0.01730 |
| src_type_cd | categorical | 4.50 | 2 | 0.01381 |
| quarter | categorical | 4.01 | 11 | 0.01232 |
| business | categorical | 2.84 | 2 | 0.00871 |
| month | categorical | 2.38 | 12 | 0.00732 |
| ckt_end_cd | categorical | 1.79 | 2 | 0.00548 |
| actvty_actn | categorical | 0.91 | 2 | 0.00281 |

CLOUD COMPUTING ENVIRONMENTS 375
VIRTUALIZED NETWORK FUNCTION CLOUD 325
VNE 330
VNE 332
VNE 334
TRANSPORT LAYER 350
BROADBAND ACCESS 110
VOICE ACCESS 130
WIRELESS ACCESS 120
MEDIA ACCESS 140
CONTENT SOURCES 175

600

FEATURE SELECTION METHOD AND SYSTEM FOR REGRESSION ANALYSIS / MODEL CONSTRUCTION

FIELD OF THE DISCLOSURE

The subject disclosure relates to machine learning and predictive modeling, and more particularly to feature selection for large-scale regression analysis tasks.

BACKGROUND

In machine learning, feature selection (FS) is the process of selecting a subset of relevant features (e.g., variables, predictors, etc.) for use in model construction. Feature selection techniques are used for several reasons: to simplify models for easier interpretation by researchers, to shorten training times, and to avoid the curse of dimensionality. The central premise when using a feature selection technique is that a set of data typically contains some features that are unrelated to a target variable, and thus can be removed without experiencing noticeable loss of information.

BRIEF DESCRIPTION OF THE DRAWINGS

Reference will now be made to the accompanying drawings, which are not necessarily drawn to scale, and wherein:

FIG. 2I depicts example results provided by the feature selection algorithm of FIG. 2H, illustrating estimated significance of numeric, categorical, and integer features impacting a continuous target variable, in accordance with various aspects described herein.

DETAILED DESCRIPTION

Figure 1:
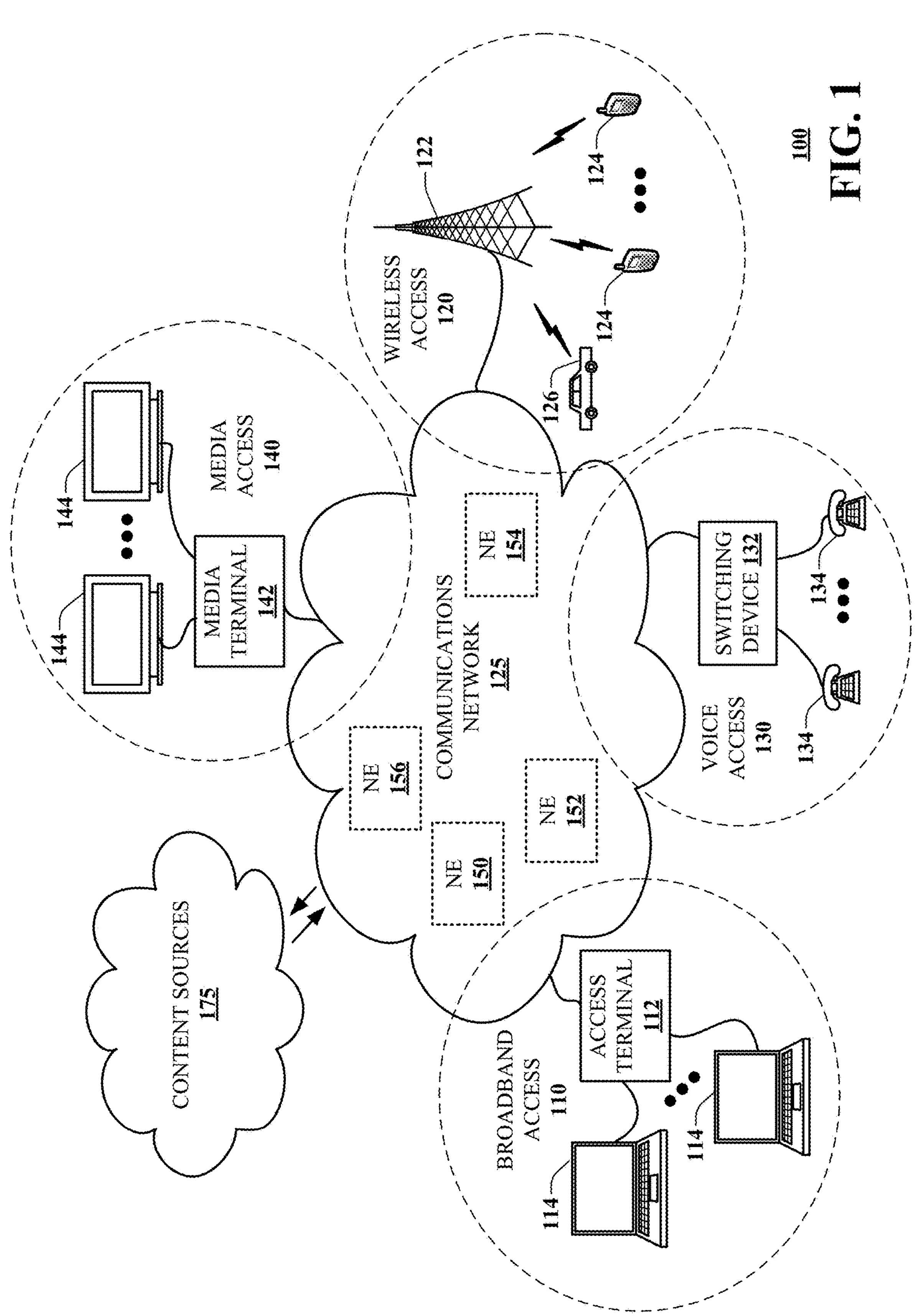
FIG. 1 is a block diagram illustrating an exemplary, non-limiting embodiment of a communications network in accordance with various aspects described herein.

Big data deals with large data sets that frequently include thousands of features. Due to the curse of dimensionality, low model explainability, and the problem of overfitting, however, it is generally impractical to use so many features to build regression models. Thus, feature selection algorithms are typically employed to filter out the least significant features so that only the most significant ones are used for constructing predictive models. However, existing feature selection algorithms are computationally expensive and are believed to be incapable of treating different types of features (numerical, categorical, integer, logical) in the same (or a common) way.

There are three main categories of feature selection algorithms: wrappers, filters, and embedded methods. Filter feature selection methods use statistical techniques to score the relationship between each input variable and a target variable, and utilize the scores as the basis for choosing (filtering) those input variables that will be used in the model. The following are brief descriptions of conventional filtering methods.

The Information Gain (IG) technique is a filter method that is based on information theory. The technique involves calculation of mutual information as a score between each feature and a target variable, and filtering of the most significant features by a threshold. Information theory considers the feature and the target variable as random variables. The concept of mutual information is a generalization of correlation coefficient for the case where random variables are not numerical. The IG technique is used to train decision trees in machine learning, but is very rarely used for feature selection as it generally does not work well for features with a large number of distinct values due to the issue of overfitting.

The Chi-square Test can be employed to test the relationship between features. However, Chi-Square is sensitive to small frequencies in cells of tables. Generally, when the expected value in a cell of a table is less than 5, Chi-square can lead to conclusory errors. Further, while Chi-square can be applied to categorical features, it cannot be applied to continuous features.

The idea behind Fisher's scoring is to find a subset of features such that, in the data space spanned by selected features, the distances between data points in different classes are as large as possible, while the distances between data points in the same class are as small as possible. Calculating the Fisher score is a combinatorial optimization problem that requires a large computational effort. Further, Fisher's scoring cannot be applied to categorical features.

Correlation is a well-known similarity measure between two features. If two features are linearly dependent, then their correlation coefficient is ±1, and, if the features are uncorrelated, then the correlation coefficient is 0. If the correlation between a feature and a target variable is higher than a threshold value (e.g., 0.5), then the feature may be selected. A disadvantage of the correlation technique is that it can be used only for continuous target variables and features. That is, correlation is inapplicable for categorical target variables and features.

The variance threshold algorithm is an unsupervised technique that ignores the target variable, and only takes the features into consideration. In particular, the algorithm calculates a variance value for each feature, and then filters out all the features with variance values that are lower than a threshold. The algorithm assumes that all available features are relevant to the target variable, where the feature with the largest variance is expected to have the largest impact on the target variable. However, if a feature with a high variance is actually irrelevant (which is often the case in real-life machine learning problems), then that feature would not be filtered out via variance thresholding, which can lead to inefficient modeling. Furthermore, variance thresholding also cannot handle categorical features.

The subject disclosure describes, among other things, illustrative embodiments of a feature selection algorithm for regression analysis/predictive modeling. In exemplary embodiments, the feature selection algorithm may be classified as a filter method, and may be configured to estimate the significance of impact of various feature types (numeric, integer, binary or logical, and categorical) on or against a (e.g., binary or continuous numerical) target variable in an automated and computationally efficient manner. The feature selection algorithm may operate based on the assumption that a change to a relevant feature should change the target variable, and thus a feature may be deemed irrelevant if a change thereto does not result in a change to the target variable.

The feature selection algorithm may be configured to process an input table (or set) of data of one or more features and a target variable, and may consider each feature against the target variable independently of other features. In exemplary embodiments, the feature selection algorithm may perform the following (e.g., generic) steps:

(a) for each feature, split the input table into subsets based on values of the feature;

(b) for each subset of each feature, determine an average value (e.g., arithmetic mean, mode, median, mid-range, or normalized sum) of the target variable; and (c) for each feature, determine a difference between the maximum and minimum average target variable values of its corresponding subsets, where the difference may be declared as a significance value (or measure of the feature significance). After all of the features are processed in this manner, the feature selection algorithm may then filter or identify the most significant features by selecting the ones that have significance values greater than a threshold, or by sorting the features according to their significance values (e.g., in descending order) and selecting the top N features associated with the highest significance values. Filtered in this manner, the selected (i.e., most significant) features can then be used to construct or generate a predictive, regression model. Using the general approach outlined above, the feature selection algorithm can estimate the significance of different types of features (against a target variable) in essentially the same way. This enables efficient comparison of feature significance for the same predictive modeling task, which creates unique opportunities for a deeper understanding of the domain and for higher quality predictive modeling and classification results. In other words, the feature selection algorithm allows all types of variables (numeric, categorical, integer, binary) to be processed in the same way, which makes significance values comparable. For instance, significance of numeric and categorical variables can be compared, and the more significant one may be easily recognized. Further, since a feature is deemed relevant to a target variable if a change to the feature value also changes the target variable (and is proportional to the feature's significance value), a feature and a target variable are essentially all that is needed for the feature selection algorithm—there is no need to separately build a model for significance estimation purposes.

In exemplary embodiments, identification or extraction of subsets (based on feature values) from an input table may be performed differently depending on the feature type. Particularly, for a numeric feature, step (a) of the general approach above may involve determining a range of the values of the feature, splitting the range of the values into a set of (e.g., equal) sub-intervals or subranges, and extracting a subset of values (e.g., in the form of a table of rows) for each sub-interval or subrange, and step (b) of the general approach above may involve calculating an average value of the target variable for each such extracted subset. In contrast, for a categorical feature, step (a) of the general approach above may involve determining a list of unique categorical values and extracting a subset (e.g., in the form of a table of rows) for each categorical value, and step (b) of the general approach above may involve calculating an average value of the target variable for each such extracted subset. In various embodiments, integer and logical (or binary) features may be processed in the same manner as categorical features, where each distinct value of an integer feature or a logical (or binary) feature may simply be treated like a value of a categorical feature.

As the feature selection algorithm is configured to work with various (e.g., all) types of features, minimal to no preprocessing of input data is needed, which conserves power resources, processing resources, memory resources, and time. Input data of any volume can be loaded and processed quickly and reliably, where the main (e.g., only) requirement may be to prepare the input data in a tabulated format so as to facilitate identification of features and the target variable.

Inefficiency of conventional feature selection approaches is a common problem for data engineers and scientists, as exploration analysis in data science projects can consume 80% or more of researcher time and resources. Embodiments of the feature selection algorithm described herein allow for reduced feature selection processing time and thus more speedy exploration analysis—i.e., from weeks to months of a semimanual process involving an expensive workforce to an automated process that (e.g., in about 10-60 minutes) can select the most significant features (with significance values above a threshold) for near immediate predictive model building. With its computational efficiency, the feature selection algorithm described herein can thus be applied to even the most challenging predictive modeling cases with hundreds, thousands, or millions of features of different types and millions of rows of data in an input table.

One or more aspects of the subject disclosure include a method. The method can comprise dividing, by a processing system including a processor, a feature range of a feature into a plurality of subsets that span the feature range.

Further, the method can include calculating, by the processing system, an average target variable value for each subset of the plurality of subsets, resulting in a plurality of average target variable values. Further, the method can include estimating, by the processing system, a measure of feature significance with respect to a target variable by determining a difference between a maximum average target variable value and a minimum average target variable value in the plurality of average target variable values.

One or more aspects of the subject disclosure include a device, comprising a processing system including a processor, and a memory that stores executable instructions that, when executed by the processing system, facilitate performance of operations. The operations can include determining a type of each feature of a plurality of features associated with a target variable. Further, the operations can include, for each feature of the plurality of features, estimating a respective significance value for that feature, relative to the target variable, based on the type of that feature, resulting in a plurality of respective significance values. Further, the operations can include performing filtering of the plurality of features based on the plurality of respective significant values.

One or more aspects of the subject disclosure include a non-transitory machine-readable medium, comprising executable instructions that, when executed by a processing system including a processor, facilitate performance of operations. The operations can include identifying a plurality of subsets for a feature associated with a target variable. Further, the operations can include determining an average target variable value for each subset of the plurality of subsets, resulting in a plurality of average target variable values. Further, the operations can include calculating a difference between a maximum average target variable value and a minimum average target variable value in the plurality of average target variable values, wherein the difference corresponds to a measure of feature significance with respect to the target variable. Further, the operations can include, based on the measure of feature significance satisfying a threshold, utilizing the feature to construct a regression or predictive model.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, feature selection for regression/predictive modeling, where the significance of impact of various feature types (numeric, integer, binary or logical, and categorical) on or against a (e.g., binary or continuous numerical) target variable may be estimated in an automated and computationally efficient manner. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In machine learning, feature selection is the process of selecting a subset of relevant features (variables or predictors) for use in model construction. A relevant feature has a causal relationship with a target variable—that is, if the feature value is changed, then the target variable value should also change accordingly. It can therefore be said that a relevant feature "impacts" the target. A "good" feature significance measure should be proportional to the impact on the target variable. Desired properties of a significance (or impact) measure $\Delta$ are as follows:

Impact of an irrelevant feature $\Delta=0$;

Impact of a relevant feature $\Delta>>0$; and $\Delta\in[0;1]$.

Exemplary embodiments of a feature selection algorithm for regression analysis are described herein. Certain definitions/equations that facilitate description of the general approach of the feature selection algorithm are as follows. Assume that a table T includes a target variable Y and K features $X_k$ (where k=1, . . . K). The target variable Y may have continuous values, and the feature variables $X_k$ may include numeric and/or categorical values. The table T may have N rows, where:

$$T=\{Y_i;X_{ki}\},k=1,\ldots,K;i=1,\ldots,N \quad (1);$$

$I$ is the complete set of row indexes of the table $T$: $I=\{1,2,\ldots,N\}$ (2);

$I$ can be represented by a set of $M$ non-intersecting subsets: $I=I_2\cup I_2\ldots\cup I_M$ (3); and $$\overline{Y}_{kj}=\frac{1}{N_{kj}}\sum_{i\in I_{kj}}Y_i,\ j=1,\ \ldots,\ M, \quad (4)$$

where $\overline{Y}_k$ is the average value of all target variable values belonging to a particular subset, and where $N_k$ is the number of items in the subset $I_k$.

Equation (4) may involve determination of an arithmetic mean. Alternatively, Equation (4) may involve determination of a median (i.e., a "middle" value separating the greater and lesser halves of a data set); a mode (i.e., the most frequent value in a data set); a mid-range (i.e., the arithmetic mean of the highest and lowest values of a data set); or a normalized sum. Each of the above options may come with advantages and disadvantages, which can be determined (e.g., experimentally) on a per task basis. In any case, based on definitions (1)-(4), the general approach of the feature selection algorithm is as follows:

1. Load input table T with binary or continuous target variable $Y=\{Y_i\}$, i=1, . . . , N and K features $X_k=\{X_{ki}\}$, i=1, . . . , N; k=1, . . . , K.
2. k=1.
3. Estimate range of the feature $X_k$, which can be:
   i) a list of categorical feature values $R_k=\{c_1,\ldots,c_L\}$, where L is a count of the categorical feature values, or
   ii) a range of a numeric feature $$R_k=\left[\max_i X_{k_{i=1}}^N-\min_i X_{k_{i=1}}^N\right].$$

4. Split the range $R_k$ into a set of M non-intersecting sub-intervals $$r_{kj}:\ R_k=\bigcup_j^M r_{kj}$$

in such a way that all values of the feature $X_k$ are equally represented by sub-intervals $r_{kj}$, j=1, . . . , M.

5. j=1.
6. Determine a set of row indexes $I_j\in I$ in the input table T for sub-interval $r_{kj}$.
7. Calculate average value $$\overline{Y}_j=\frac{1}{N_j}\sum_{i\in I_j}Y_i.$$

8. If j<M then j=j+1; then return to step 6 above.
9. Calculate the measure of significance for the feature k:

$$\Delta_k=\left[\max\left(\overline{Y}_{j=1}^M\right)-\min\left(\overline{Y}_{j=1}^M\right)\right].$$

10. If k<K then k=k+1; then return to step 3 above.
11. Filter features with significance $\Delta>\Delta_{threshold}$; and use the features to build a predictive model.

As used herein, feature range refers to a container that includes all of the values of the feature. The core of the feature selection algorithm is to identify how average target variable values are distributed over the range, and to estimate the feature impact on the target variable based on the distribution. As a numeric feature is an ordered set of data, its range of values are contained between (inclusive of) maximum and minimum values. As a categorical feature is an unordered set of labels, it is not possible to estimate its minimum and maximum values, and thus the feature "range" can be represented by a list of unique categorical values.

It is to be understood and appreciated from the above-mentioned description of the general approach of the feature selection algorithm that the same approach can be used for different types of features (i.e., numeric, categorical, integer, and logical). As described in more detail below, steps 3 and/or 4 of the approach above may differ for numeric and categorical features in that, for a numeric feature, the numerical feature range may be split into a set equal, non-intersecting sub-intervals (where an average target variable value may be calculated for each of the sub-intervals, and where the average values represent dependency of the target variable on the numeric feature over the numerical feature range), and, for a categorical feature, a list of unique categorical values may be determined (where an average target variable value may be calculated for each of the unique categorical values, and where the average values represent dependency of the target variable on the categorical feature across the unique categorical values in the list).

Figure 2A:
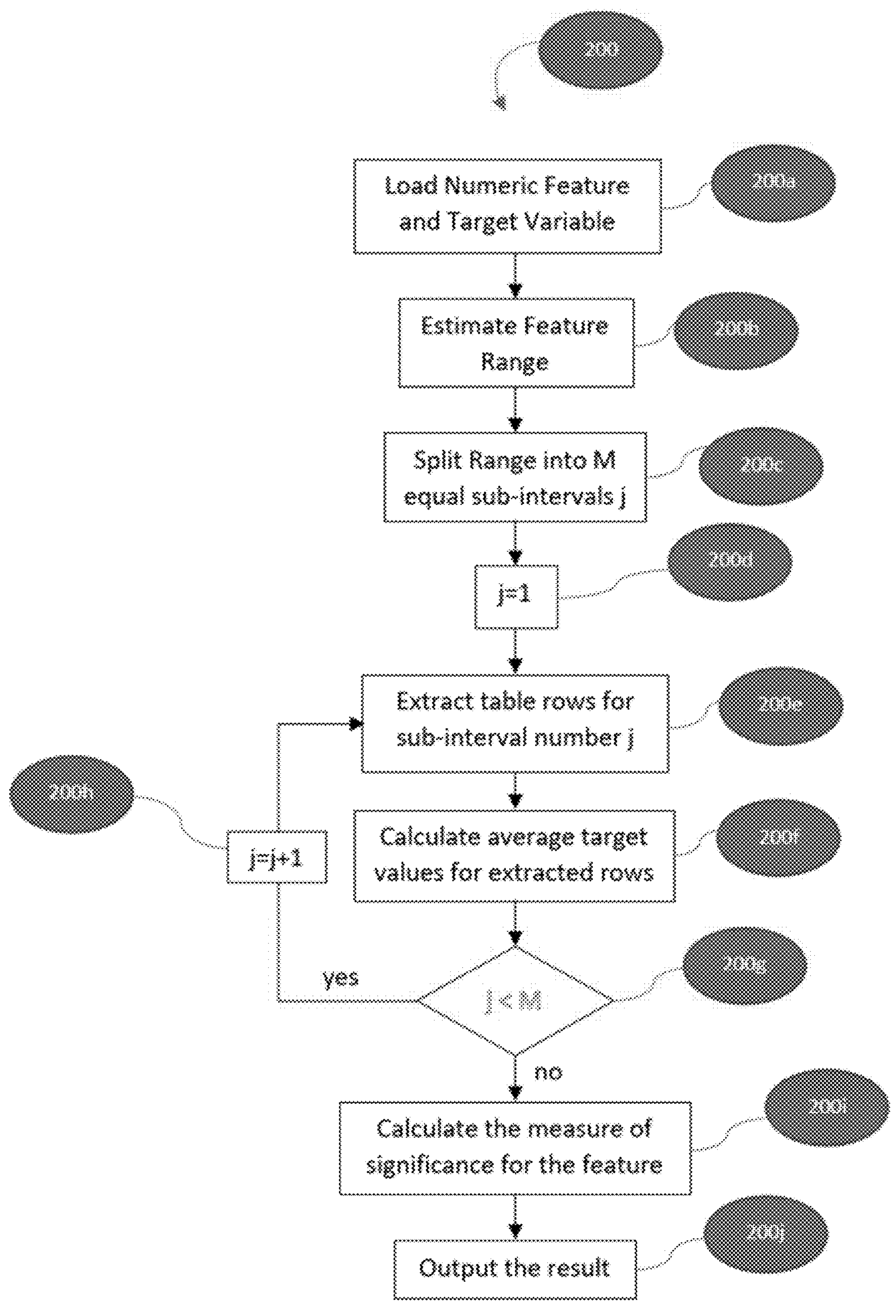
FIG. 2A is a flow chart illustrating an example algorithm or method for feature significance estimation for a numeric feature in accordance with various aspects described herein.

FIG. 2A is a flow chart illustrating an example algorithm or method 200 for feature significance estimation for a numeric feature in accordance with various aspects described herein. In various embodiments, the method 200 may be implemented by a computing device, a network element/equipment, or any other device that includes a processor. For instance, the method 200 may be implemented in one or more devices included in, or associated with, the communications network 100 of FIG. 1. In exemplary embodiments, the method 200 may be configured to estimate the significance for a single numeric feature, and can be used or called (as a module) by another algorithm or method, such as the method 280 of FIG. 2H (described in more detail below).

The method 200 may begin at 200*a*, where a numeric feature $X=\{x_i\}$, i=1, N and a (e.g., continuous) target variable $Y=\{y_i\}$, i=1, . . . , N may be loaded into an input table T, where N is the number of rows in the input table.

At 200*b*, the numeric feature range may be estimated as a difference between maximum and minimum values of the feature X:

$$R = \left[\max_i X_{i=1}^N - \min_i X_{i=1}^N\right].$$

At 200*c*, the range R may be split into M equal non-intersecting sub-intervals $$r_{kj} : R = \bigcup_j^M r_j.$$

As an example, for the range R=[0; 5], M may be=5, where the following 5 sub-intervals may be created: $r_1$=[0; 1]; $r_2$=[1; 2]; $r_3$=[2; 3]; $r_4$=[3; 4]; $r_5$=[4; 5]. In various embodiments, the number of sub-intervals M may be determined based on the data volume N such that there are sufficient data points in each sub-interval. Where more detailed information about a given feature is desired, a larger number of sub-intervals may be needed. As some examples, if there are millions of rows/records in the input table T, then M may be anywhere from about 50 to about 100; if there are hundreds of (or a thousand) rows/records in the input table T, then M may be anywhere from about 20 to about 30; and if there are several thousand rows/records in the input table T, then M may be anywhere from about 5 to about 10 (which should avoid extracting sub-intervals that have no data points therein).

At 200*d*, sub-interval index j may be set to 1.

At 200*e*, all the records in the input table T that satisfy the following condition: $X \in r_j$, which is equivalent to the condition: (X≥0) & (X<1), may be extracted. That is, all row indexes $I_j \in I$ in the input table T that satisfy the condition $X \in r_j$ may be determined.

At 200*f*, an average value for all extracted rows may be calculated:

$$\overline{Y}_j = \frac{1}{N_j}\sum\nolimits_{i \in I_j} Y_i.$$

At 200*g*, the condition j<M may be checked. If the condition is satisfied ("yes"), then the current sub-interval number j may be incremented: j=j+1 at 200*h*, and the process may return to step 200*e*. If the condition is not satisfied ("no")—i.e., the average values for all sub-intervals have been estimated, then the process may proceed to step 200*i*, where the measure of significance for the feature X may be calculated:

$$\Delta = \left[\max_j \overline{Y}_{j=1}^M - \min_j \overline{Y}_{j=1}^M\right].$$

At 200*j*, the measure of significance for the feature X may then be outputted.

Figure 2B:
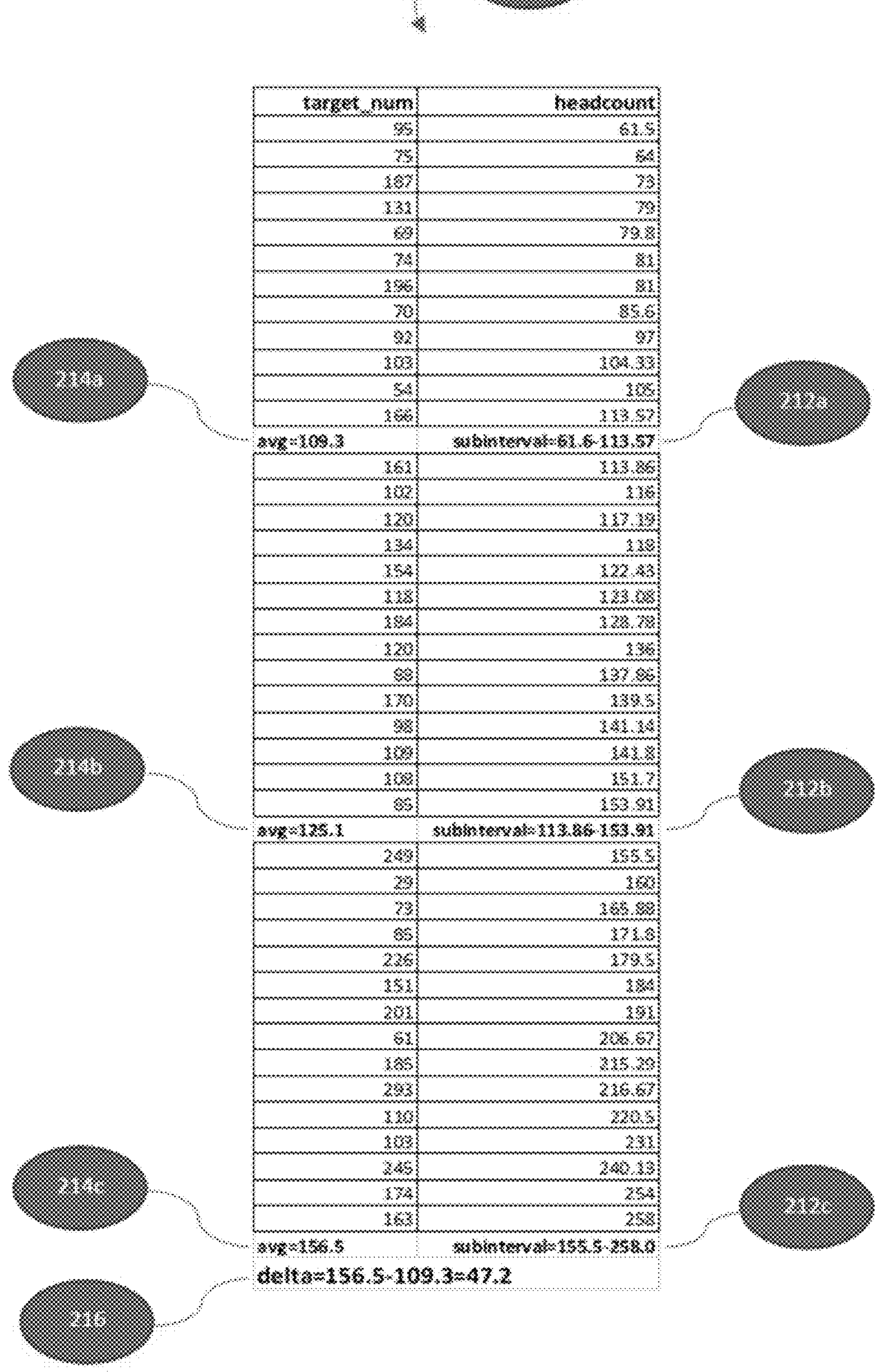
FIG. 2B illustrates an example table of values of a numeric feature and a target variable, including example determinations of sub-intervals, average target variable values, and significance of the numeric feature using the method of FIG. 2A in accordance with various aspects described herein.

FIG. 2B illustrates an example table of values of a numeric feature and a target variable, including example determinations of sub-intervals, average target variable values, and significance of the numeric feature using the method 200 of FIG. 2A in accordance with various aspects described herein.

As shown by reference number 210, the "target_num" variable represents the target variable, and the "headcount" variable represents the numeric feature. The table may be sorted by the numeric feature "headcount," its range R may be identified as [61.5; 258.0], and the range R may be split into, for instance, three sub-intervals: $r_1$=[61.5; 113.57] (as shown by reference number 212*a*); $r_2$=[113.86; 153.91] (as shown by reference number 212*b*); and $r_3$=[155.5; 258.0] (as shown by reference number 212*c*).

An average value (e.g., mean) may be calculated for sub-interval $r_1$: $\overline{X}_1$=109.3 (as shown by reference number 214*a*), an average value (e.g., mean) may be calculated for sub-interval $r_2$: $\overline{X}_2$=125.1 (as shown by reference number 214*b*), and an average value (e.g., mean) may be calculated for sub-interval $r_3$: $\overline{X}_3$=156.5 (as shown by reference number 214*c*). The measure of significance may then be calculated (reference number 216) as a difference between maximum and minimum average values: delta=156.5−109.3=47.2.

Figure 2C:
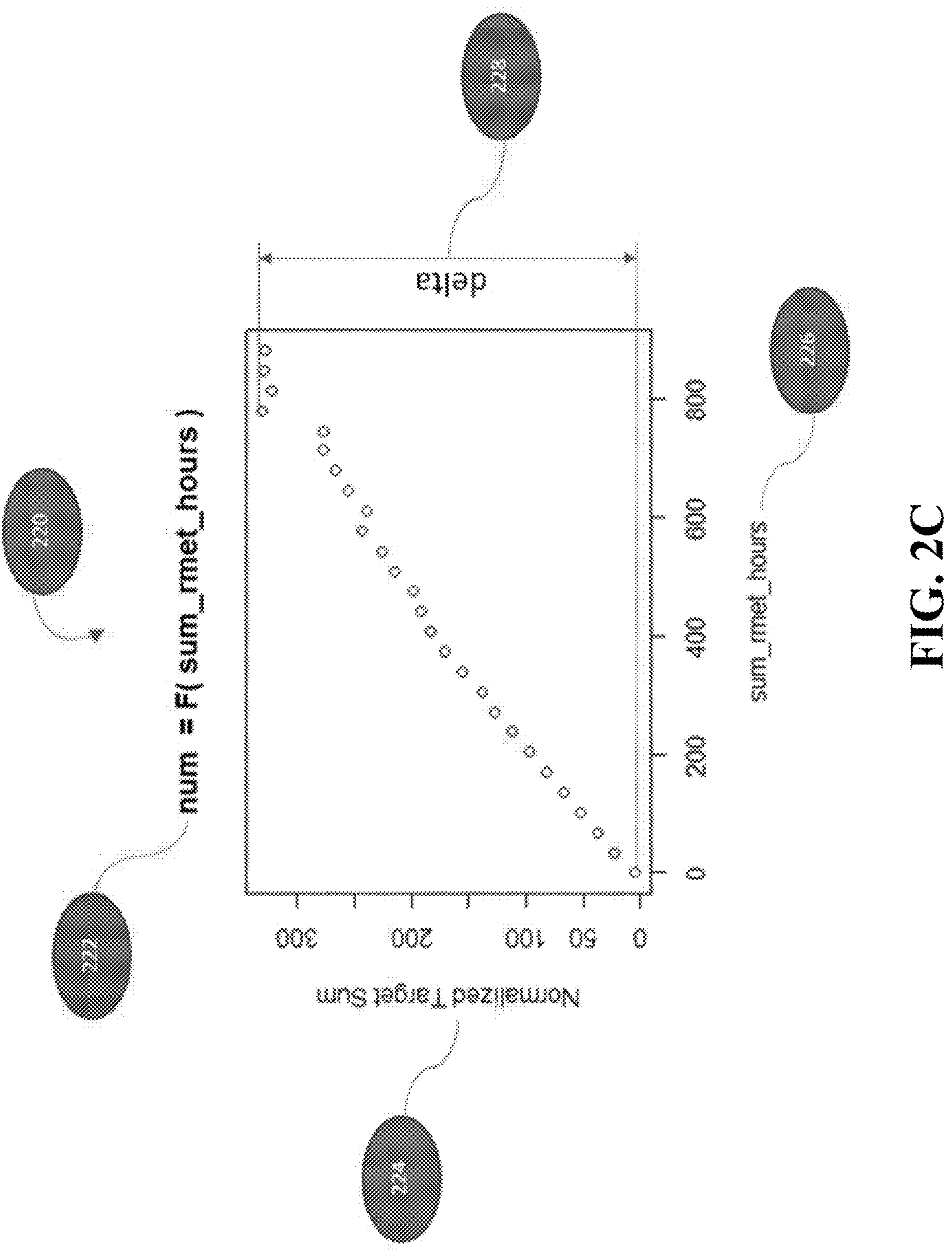
FIG. 2C shows an example graphical representation of target variable dependency on a numeric feature over a numeric feature range in accordance with various aspects described herein.

FIG. 2C shows an example graphical representation of target variable dependency on a numeric feature over a numeric feature range in accordance with various aspects described herein. In various embodiments, the graphical representation may be generated by the method 200 or based on data outputted by the method 200.

As depicted in FIG. 2C, "num" represents the target variable name (reference number 222), the vertical axis (reference number 224) reflects determined values for the target variable, and "sum_rmet_hours" represents the numeric feature and the horizontal axis (reference number 226). Here, the feature range is equal to 850, and may be split into a set of 30 equal sub-intervals (i.e., M=30). The dots in the graph show the distribution of the variable "num" over range R of the feature "sum_rmet_hours"=[0; 850]. Reference number 228 illustrates the difference between maximum and minimum values (the measure of the feature significance):

$$\text{delta} = \left[\max_j \overline{Y}_{j=1}^M - \min_j \overline{Y}_{j=1}^M\right].$$

As can be seen in the graph of FIG. 2C, the maximum of target variable "num" corresponds with feature "sum_rmet_hours"=800, and the lower values of the feature "sum_rmet_hours" correspond with very low values of target variable "num," which provides crucial information as to the dependency of num=F(sum_rmet_hours). Providing a visualization of such dependency (or target=F(feature)) enables operators to quickly and easily learn the interrelationships between a target variable and each feature in a data set, and thus facilitates optimal or improved construction of regression model(s).

Figure 2D:
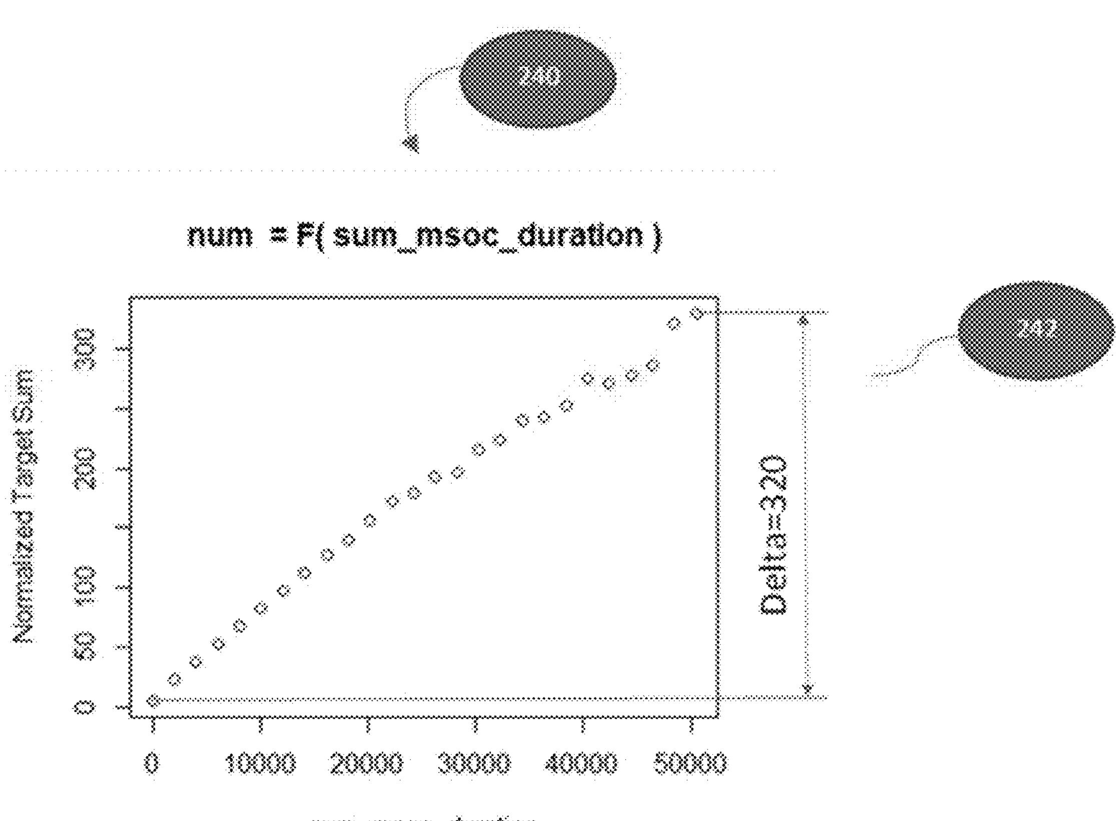
FIG. 2D shows example graphical representations of target variable dependencies on two numeric features in accordance with various aspects described herein.
Figure 2D:
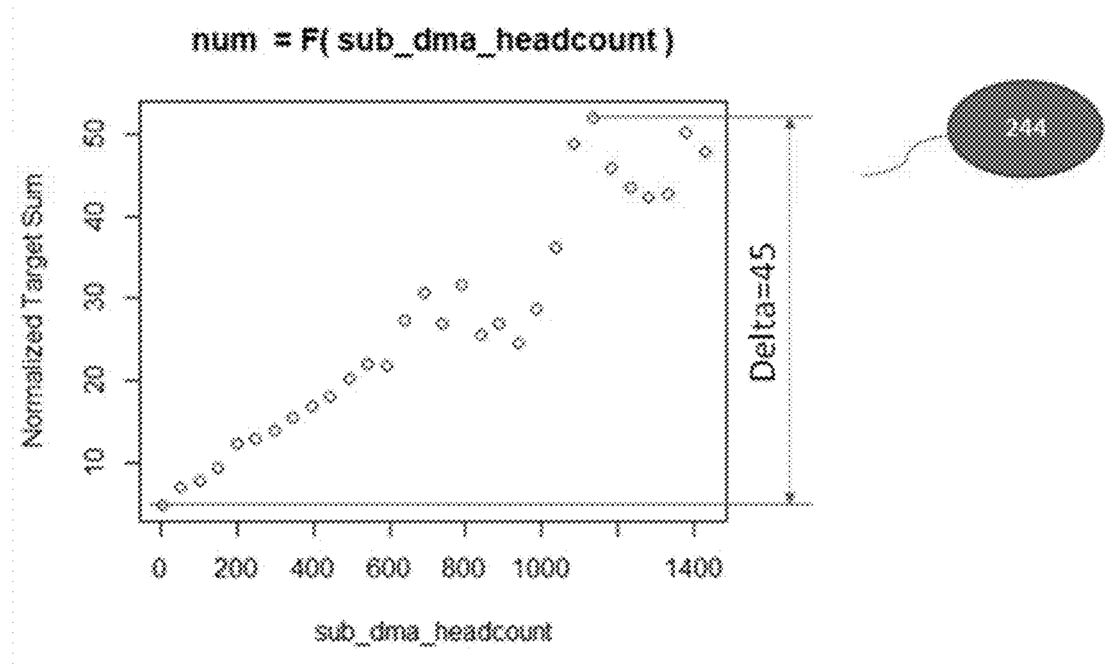

FIG. 2D shows example graphical representations 240 of target variable dependencies on two numeric features in accordance with various aspects described herein. The significance of two numeric features "sum_msoc_duration" and "sub_dma_headcount" are shown in graph 242 (with a smooth target mean distribution) and graph 244 (with a "rough" and "noisy" average value distribution line), respectively. As can be seen in the graphs, the significance of the feature "sum_msoc_duration" on target variable "num" (delta=320) is much greater than the significance of feature "sub_dma_headcount" (delta=45).

Figure 2E:
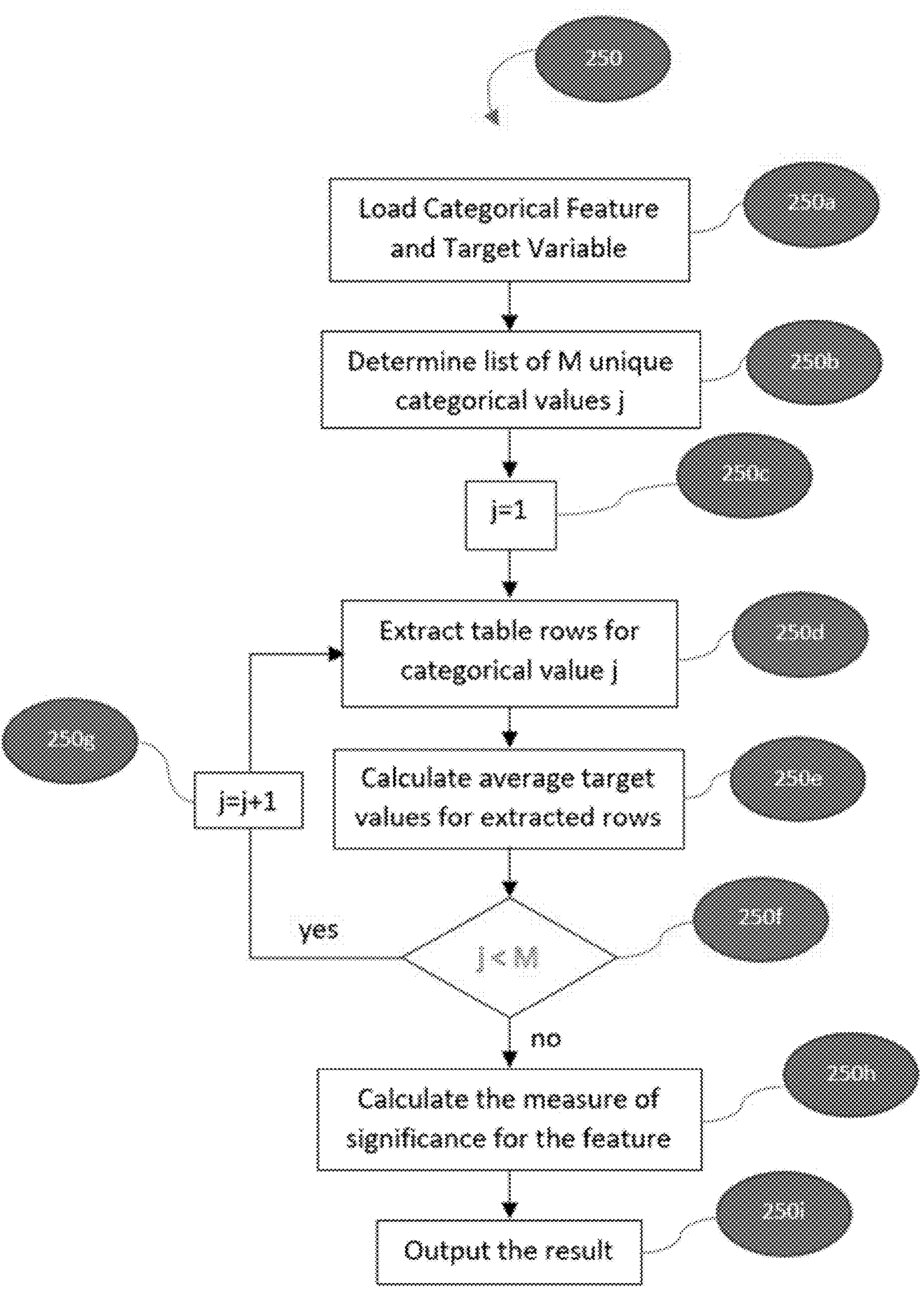
FIG. 2E is a flow chart illustrating an example algorithm or method for feature significance estimation for a categorical feature in accordance with various aspects described herein.

FIG. 2E is a flow chart illustrating an example algorithm or method 250 for feature significance estimation for a categorical feature in accordance with various aspects described herein. In various embodiments, the method 250 may be implemented by a computing device, a network element/equipment, or any other device that includes a processor. For instance, the method 250 may be implemented in one or more devices included in, or associated with, the communications network 100 of FIG. 1. In exemplary embodiments, the method 250 may be configured to estimate the significance for a single categorical feature, and can be used or called (as a module) by another algorithm or method, such as the method 280 of FIG. 2H.

The method 250 may begin at 250*a*, where a categorical feature $X=\{x_i\}$, i=1, . . . , N and a (e.g., continuous) target variable $Y=\{y_i\}$, i=1, . . . , N may be loaded into an input table T, where N is the number of rows in the input table.

At 250*b*, a list of unique categorical values $\{x_j\}$, i=1, . . . , M may be determined.

At 250*c*, the unique categorical value j may be set to 1.

At 250*d*, all the records in the input table T that satisfy the following condition: $X=x_j$, which includes all rows in the input table T having a categorical value equal to $x_j$, may be extracted. That is, all row indexes $I_j \in I$ in the input table T that satisfy the condition $X=x_j$ may be determined.

At 250*e*, an average value of the target variable for the current categorical value $x_j$ may be calculated:

$$\overline{Y}_j = \frac{1}{N_j}\sum\nolimits_{i\in I_j} Y_i$$

(for all the rows extracted for categorical value $x_j$).

At 250*f*, the condition j<M may be checked. If the condition is satisfied ("yes"), then the current sub-interval number j may be incremented: j=j+1 at 250*g*, and the process may return to step 250*d*. If the condition is not satisfied ("no")—i.e., the average values for all categorical values have been estimated, then the process may proceed to step 250*h*, where the measure of significance for the feature X may be calculated:

$$\Delta = \left[\max_j \overline{Y}_{j=1}^{M} - \min_j \overline{Y}_{j=1}^{M}\right].$$

At 250*i*, the measure of significance for the feature X may then be outputted.

Figure 2F:
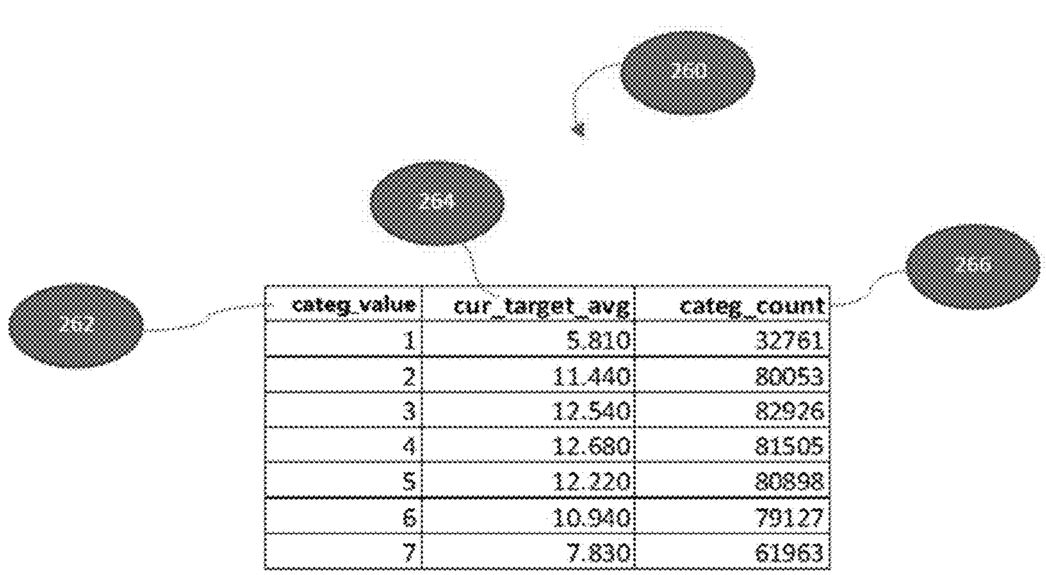
FIG. 2F illustrates an example table of results of feature significance estimation (using the method of FIG. 2E) for a categorical feature, and a graphical representation of target variable dependency on the categorical feature over a categorical feature range, in accordance with various aspects described herein.
Figure 2F:
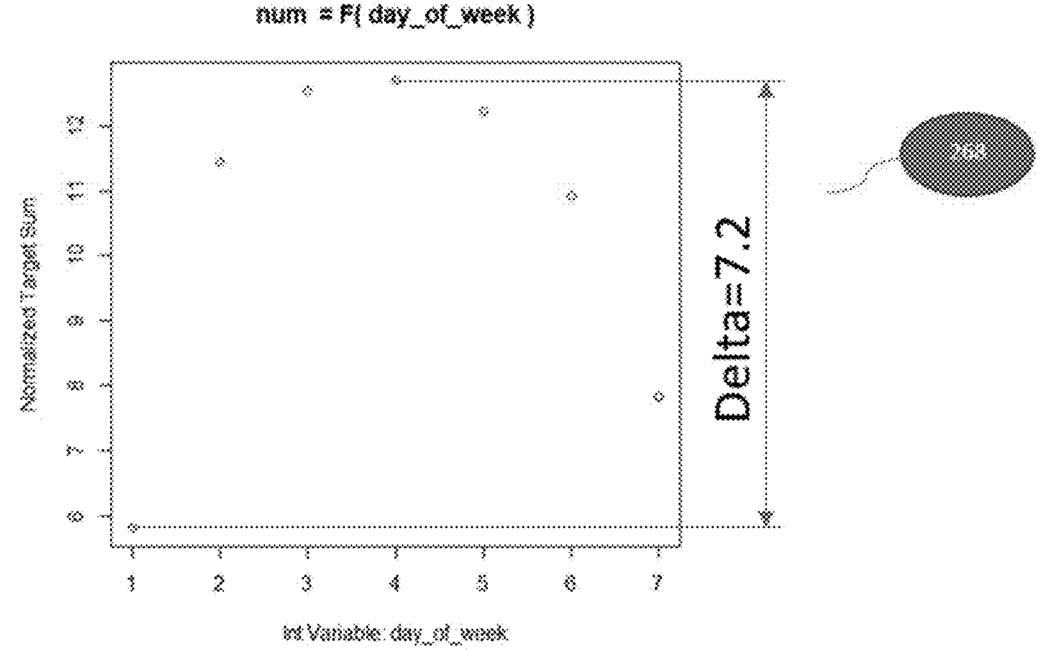

FIG. 2F illustrates an example table 260 of results of feature significance estimation (using the method 250 of FIG. 2E) for a categorical feature, and a graphical representation 268 of target variable dependency on the categorical feature over a categorical feature range, in accordance with various aspects described herein.

Here, the categorical feature may have 7 unique categorical values (reference number 262) in a column "categ_value," where average target variable values for the different categorical values are included in a column "cur_target_avg" (reference number 264), and where the number of rows extracted from the input table T for each categorical value are included in a column "categ_count" (reference number 266). Graph 268 provides a visualization of the data in columns 262 and 264—i.e., showing how the average target variable values are distributed over the categorical feature range of values (e.g., from 1 (Sunday) to 7 (Saturday)), where the significance of the categorical feature is determined to be delta=7.2.

In exemplary embodiments, an algorithm or method may be provided for estimating the significance of an integer feature. In various embodiments, the integer feature-related algorithm or method may be implemented by a computing device, a network element/equipment, or any other device that includes a processor. For instance, the integer feature-related algorithm or method may be implemented in one or more devices included in, or associated with, the communications network 100 of FIG. 1. In exemplary embodiments, the integer feature-related algorithm or method can be used or called (as a module) by another algorithm or method, such as the method 280 of FIG. 2H. In one or more embodiments, the integer feature-related algorithm or method may be similar to the method 250 of FIG. 2E. Particularly, the method 250 may be adapted for processing integer features—e.g., where step 250*a* of the method 250 may involve loading of an integer feature $X=\{x_i\}$, i=1, . . . , N (rather than a categorical feature), where the step 250*b* of the method 250 may involve determining of a list of unique integer values $\{x_j\}$, i=1, . . . , M (rather than unique categorical values), and where the step 250*c* of the method 250 may involve extraction of rows of data for a unique integer value (rather than for a unique categorical value).

Figure 2G:
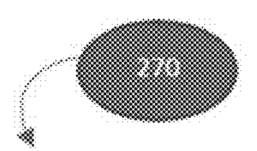
FIG. 2G shows example graphical representations of the distribution of average target variable values for two integer features in accordance with various aspects described herein.
Figure 2G:
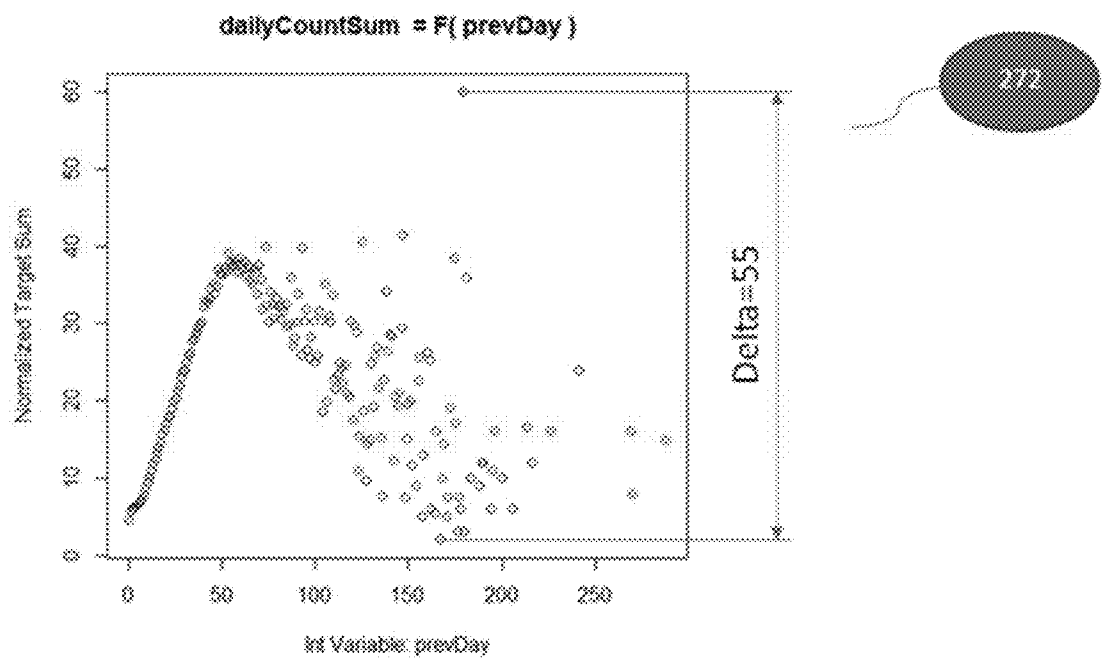
Figure 2G:
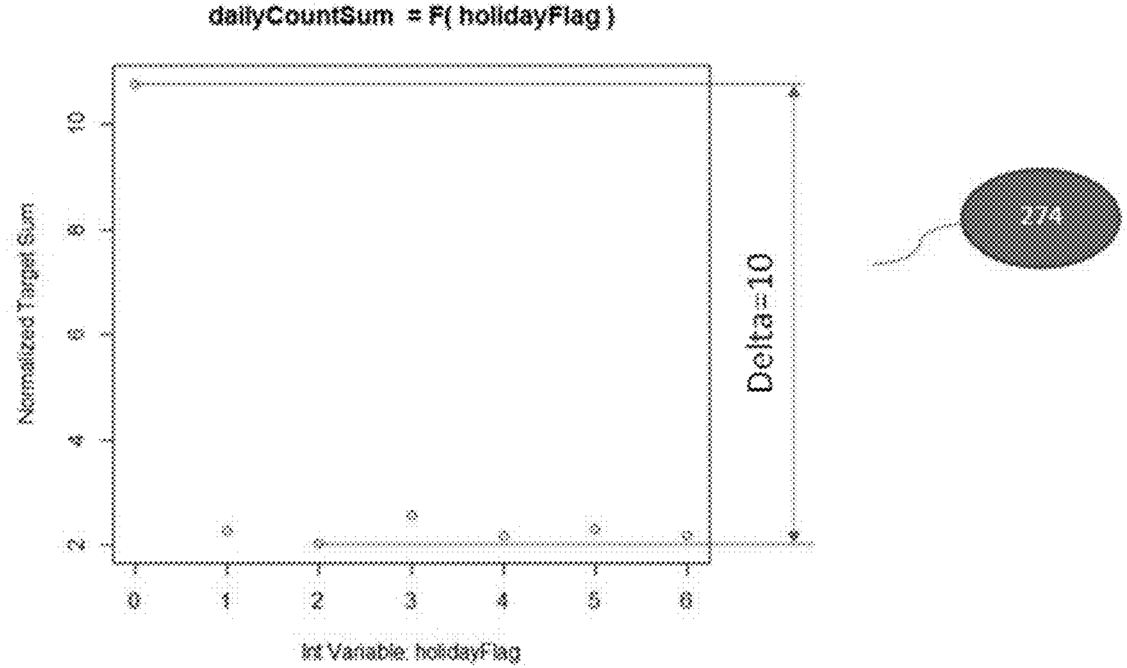

FIG. 2G shows example graphical representations 270 of the distribution of average target variable values for two integer features in accordance with various aspects described herein. The significance of two integer features "prevDay" and "holidayFlag" are shown in graph 272 and graph 274, respectively. As can be seen in the graphs, the significance of the feature "prevDay" on target variable "dailyCountSum" (delta=55) is much greater than the significance of feature "holidayFlag" (delta=10).

Logical features have only two unique values—e.g., TRUE/FALSE, YES/NO, I/O, etc. Conceptually, logical features may be considered a special case of categorical features, but with just two unique values. In various embodiments, the method 250 of FIG. 2E may be used (or adapted) for processing logical features.

Figure 2H:
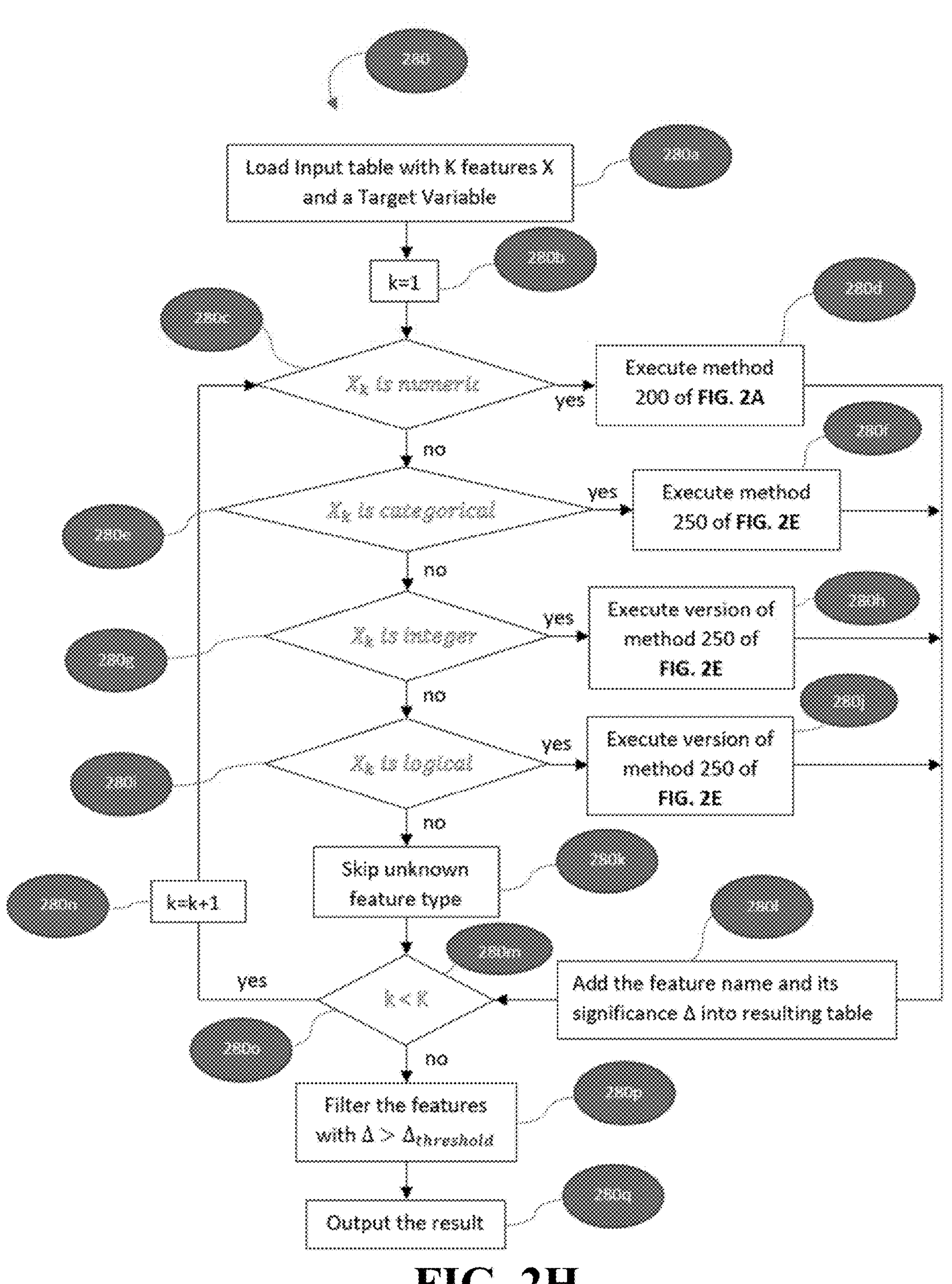
FIG. 2H is a flow chart illustrating an example algorithm or method for feature significance estimation for different types of features (i.e., numeric, categorical, integer, and logical) in accordance with various aspects described herein.

FIG. 2H is a flow chart illustrating an example algorithm or method 280 for feature significance estimation for different types of features (i.e., numeric, categorical, integer, and logical) in accordance with various aspects described herein. In various embodiments, the method 280 may be implemented by a computing device, a network element/equipment, or any other device that includes a processor. For instance, the method 280 may be implemented in one or more devices included in, or associated with, the communications network 100 of FIG. 1. In exemplary embodiments, the method 280 may be configured to call one or more other algorithms/methods to estimate the significance of the different types of features against a target variable. For example, the method 280 may be configured to call or utilize the method 200 for estimating the significance of numeric feature(s), the method 250 for estimating the significance of categorical feature(s), and/or the method 250 (or an adapted version of the method 250) for estimating the significance of logical (or binary) feature(s) and/or integer feature(s).

The method 280 may begin at 280*a*, where a (e.g., continuous or binary) target variable $Y=\{Y_i\}$, i=1, N and K features $X_k=\{X_{ki}\}$, i=1, . . . , N (where k=1, . . . , K) may be loaded into an input table T. In exemplary embodiments, the method 280 may process the various (e.g., all) features in the input table Tin a loop-based manner.

At 280*b*, a counter k may be set to 1.

Next, the method 280 may include determining the type of a current feature $X_k$ (steps 280*c*, 280*e*, 280*g*, and 280*i*) and call or utilize the appropriate feature significance estimator method or algorithm. Determining the feature type can be performed in any suitable manner—via pre-built functions such as "isnumeric(feature)," "isinteger(feature)," or the like available in various programming languages, such as R, Python, and so on. Categorical and logical features can also be determined programmatically. In a first case where the current feature $X_k$ is a numeric feature, then the method 280 may call or utilize (280*d*) the method 200 of FIG. 2A to determine feature significance Δ (e.g., by performing one or more steps of method 200, beginning from step 200*a* or 200*b*, etc.). In a second case where the current feature $X_k$ is a categorical feature, then the method 280 may call or utilize (2800 the method 250 of FIG. 2E to determine feature significance Δ (e.g., by performing one or more steps of method 250, beginning from step 250*a* or 250*b*, etc.). In a third case where the current feature $X_k$ is an integer feature, then the method 280 may call or utilize (280*h*) the method 250 of FIG. 2E (or an adapted version thereof as described above) to determine feature significance Δ. In a fourth case where the current feature $X_k$ is a logical feature, then the method 280 may call or utilize (280*j*) the method 250 of FIG. 2E (or an adapted version thereof) to determine feature significance Δ. In any of the aforementioned first through fourth cases, the feature name and its determined significance value may be added to a result table $T_{res}$ at 2801. In a situation where the type of a current feature $X_k$ does not belong to one of the supported feature types, then that feature may be skipped (280*k*). Examples of unsupported/unknown feature types may include graphical data/images and complicated data structures (e.g., arrays, textual information, BLOBs that store binary data, etc.).

At 280*m*, the condition k<K may be checked. If the condition is satisfied ("yes"), then the value k may be incremented: k=k+1 at 280*n*, and the process may return to step 280*c*. If the condition is not satisfied ("no")—i.e., all features have been processed and significances thereof estimated, then the process may proceed to step 280*p*, where the features may be sorted according to their significance values and/or filtered relative to a significance threshold: $\Delta>\Delta_{threshold}$. At step 280*q*, the method 280 may output results of the sorting/filtering (e.g., in the result table $T_{res}$). In exemplary embodiments, the method 280 may further include building or constructing a predictive model using the outputted results—i.e., using the features determined to have the most significant impact on the target variable.

It is to be appreciated and understood that the method 280 is designed to process any input table that has multiple columns (variables) of data, including one column that corresponds to a numeric target variable, and remaining columns that correspond to various types of features (i.e., any mixtures of numeric, categorical, integer, and/or logical features). It is also to be appreciated and understood that the feature selection algorithm(s) described herein (e.g., the methods 280, 200, 250, and/or adapted version(s) thereof) enable estimation of significance of features against a target variable and facilitate quick and efficient construction of regression models in any context or field.

The following is a brief description of an example scenario in which the feature selection algorithm(s) described herein are used in a job volume regression analysis context for predicting the number of customer service requests that might be received. In a job volume context, it can be important to predict job volume over the next week and/or month in order for a business or organization to make the necessary personnel-based preparations for servicing the requests in a timely manner. Here, the target variable (i.e., "num") for the job volume task may be continuous, and may be associated with a complete list of numeric, categorical, and integer features, which enables testing of different aspects of the feature selection algorithm(s), and building of a regression model based on features selected by the algorithm(s). FIG. 2I depicts example results 290 provided by the feature selection algorithm 280 of FIG. 2H, illustrating estimated significance of numeric, categorical, and integer features impacting a continuous target variable, in accordance with various aspects described herein. As shown in FIG. 2I, a column "var_name" (290*a*) includes feature names, and a column "var_type" (290*b*) includes feature types, such as numeric, categorical, integer, and logical. Additionally, a column "delta" (290*c*) corresponds to feature significance. Here, the table 290 may be sorted according to the delta values—e.g., in descending order with the maximum delta value of 325.69 (corresponding to the most significant feature) at the top of the list. As depicted in FIG. 2I, a column "bin_count" (290*d*) includes the number of sub-intervals for numeric features and the number of unique values for categorical, integer, and logical features. For instance, as shown, the value of "bin_count" is 129 for the feature "city," which is a categorical variable with 129 unique categorical values. As also depicted in FIG. 2I, a column "delta_norm" (290*e*) includes normalized feature significance values, which may be calculated by dividing the values in the column "delta" by the maximum delta value of 325.69. For instance, as shown, the feature "sum_edw_duration" is the most significant feature, with delta_norm=1.0, and the feature "actvty_acctn" is the least significant feature, with delta_norm=0.00281.

To prove the efficiency of feature selection algorithm 280, two predictive models were built using the results shown in FIG. 2I, and R-squared (RSQ) were calculated, which can be interpreted as a percentage of input data "explained" by the predictive model. RSQ is a statistical measure of how close the data are to a fitted regression line, and is also known as the coefficient of determination:

$$RSQ = 1 - \frac{\sum_i (y_i - f_i)^2}{\sum_i (y_i - \bar{y})^2},$$

where $y_i$ represents observed feature values, $f_i$ represents predicted feature values, and $\bar{y}$ represents the mean of the observed data. The first model was built using the 19 most significant features (i.e., 290*f* of FIG. 2I), and yielded RSQ=0.971—i.e., meaning that the 19 most significant features explain 97.1% of the input data. The second model was built using the 29 least significant features (i.e., 290 g of FIG. 2I), and yielded RSQ=0.362—i.e., meaning that the 29 least significant features explain just 36.2% of the input data. These results prove the effectiveness and efficiency of the exemplary feature selection algorithm(s) described herein.

It is to be understood and appreciated that, although FIGS. 2A, 2E, and 2H are described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein.

It is also to be appreciated that any of the methods of FIGS. 2A, 2E, and 2H may be implemented in (e.g., included as part of) a regression/predictive modeling system or process where machine learning or other artificial intelligence (AI) algorithms may be employed. Further, as there may be hundreds, thousands, millions, billions, etc. of features and/or rows of input data to be subjected to feature selection, the methods of FIGS. 2A, 2E, and 2H can operate on data sets that cannot be managed manually or objectively by a human actor.

Figure 3:
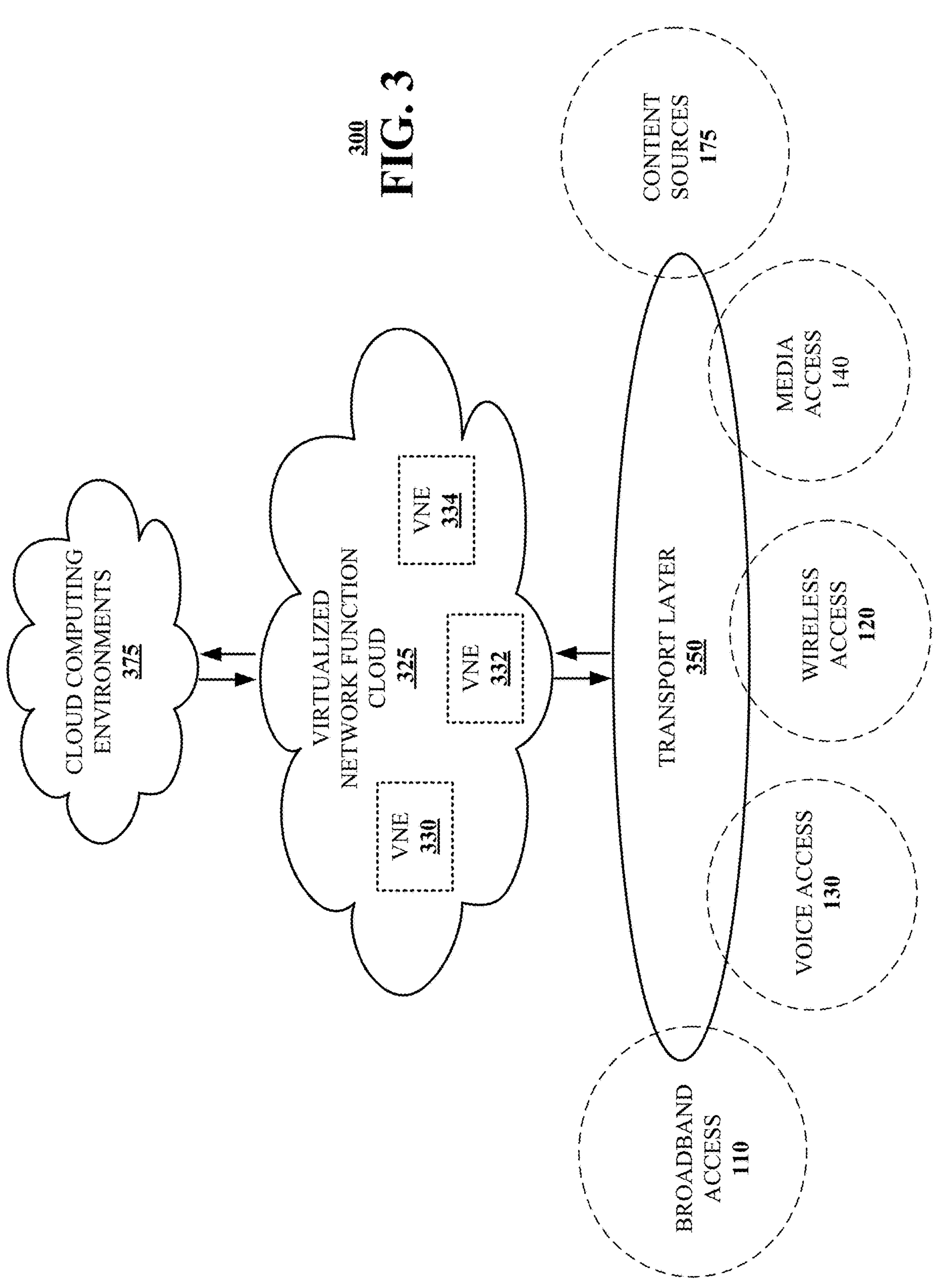
FIG. 3 is a block diagram illustrating an example, non-limiting embodiment of a virtualized communications network in accordance with various aspects described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100 and methods 200, 250, and 280 presented in FIGS. 1, 2A, 2E, and 2H. For example, virtualized communications network 300 can facilitate, in whole or in part, feature selection for regression/predictive modeling, where the significance of impact of various feature types (numeric, integer, binary or logical, and categorical) on or against a continuous numerical target variable may be estimated in an automated and computationally efficient manner.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
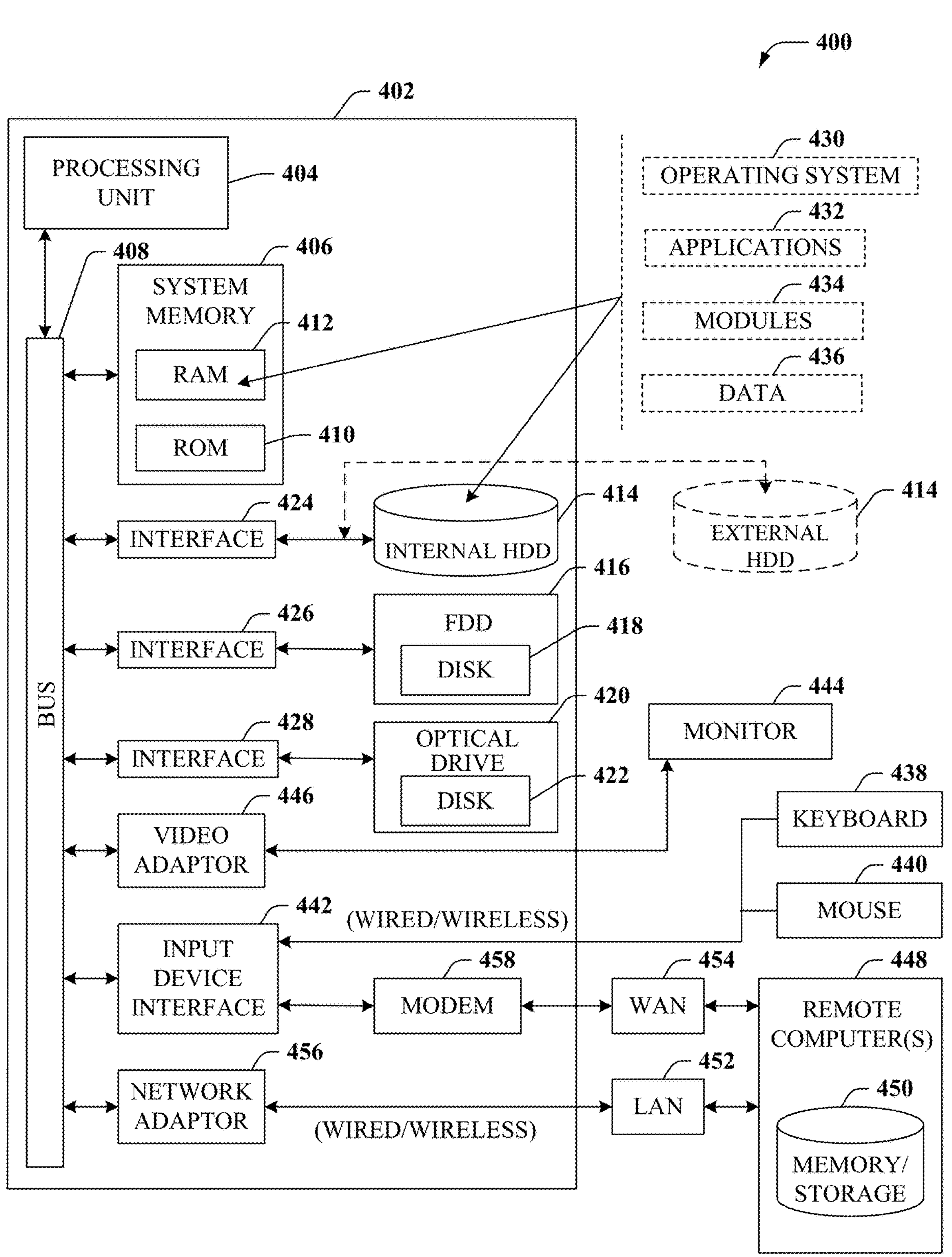
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, feature selection for regression/predictive modeling, where the significance of impact of various feature types (numeric, integer, binary or logical, and categorical) on or against a continuous numerical target variable may be estimated in an automated and computationally efficient manner.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
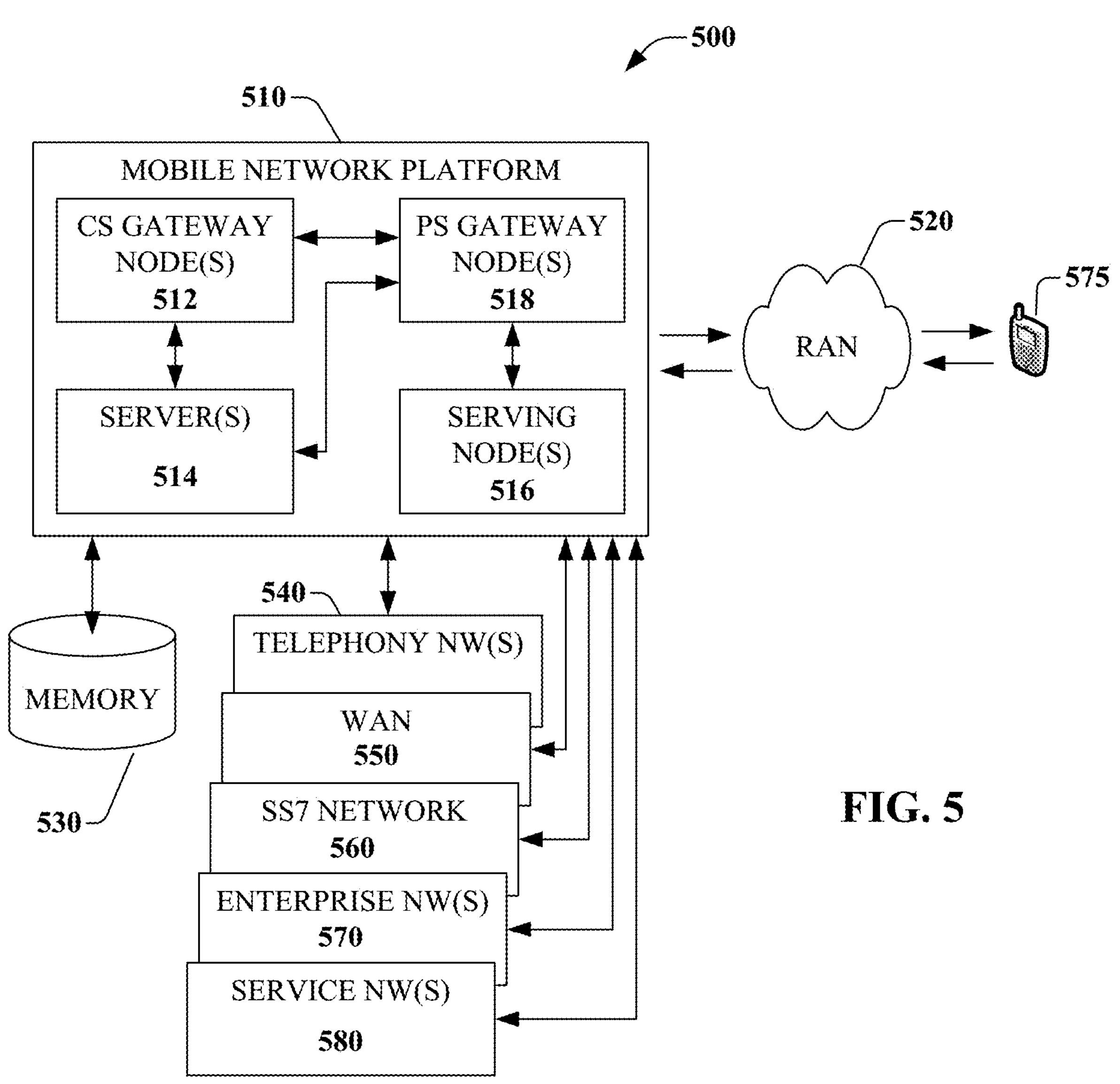
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, feature selection for regression/predictive modeling, where the significance of impact of various feature types (numeric, integer, binary or logical, and categorical) on or against a continuous numerical target variable may be estimated in an automated and computationally efficient manner. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flatrate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
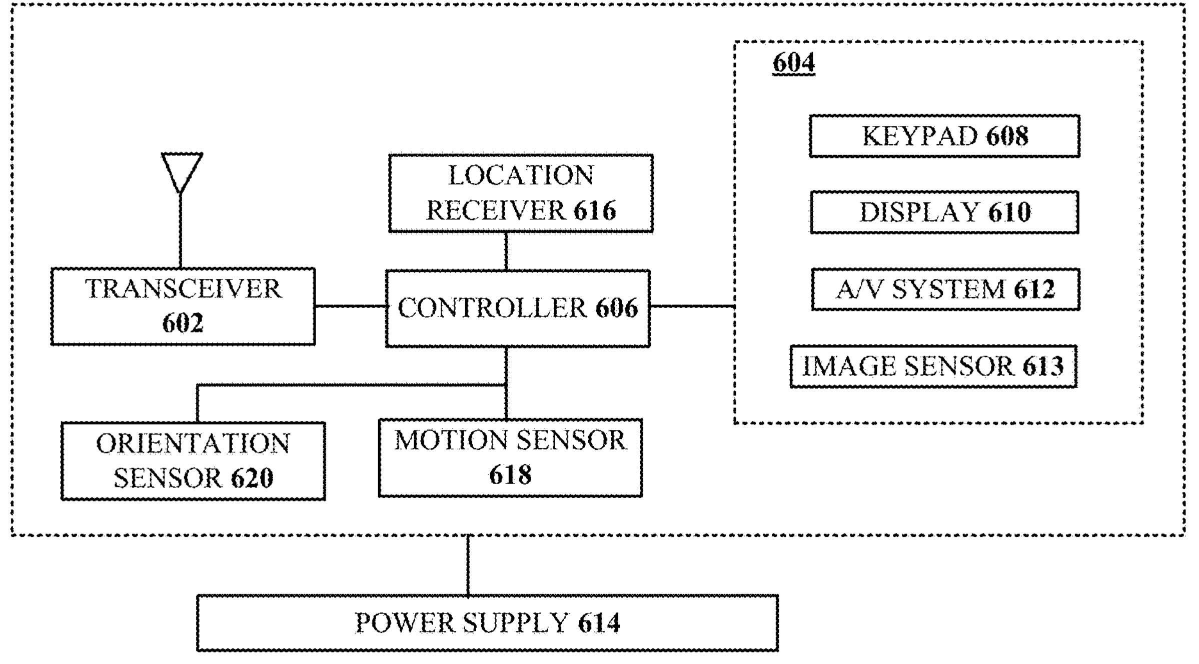
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via communications network 125. For example, computing device 600 can facilitate, in whole or in part, feature selection for regression/predictive modeling, where the significance of impact of various feature types (numeric, integer, binary or logical, and categorical) on or against a continuous numerical target variable may be estimated in an automated and computationally efficient manner. The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles “a” and “an” as used in this application and the appended claims should generally be construed to mean “one or more” unless specified otherwise or clear from context to be directed to a singular form.

Moreover, terms such as “user equipment,” “mobile station,” “mobile,” subscriber station,” “access terminal,” “terminal,” “handset,” “mobile device” (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms “user,” “subscriber,” “customer,” “consumer” and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term “processor” can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as “data storage,” data storage,” “database,” and substantially any other information storage component relevant to operation and functionality of a component, refer to “memory components,” or entities embodied in a “memory” or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term “includes” is used in either the detailed description or the claims, such term is intended to be inclusive in a manner similar to the term “comprising” as “comprising” is interpreted when employed as a transitional word in a claim.

In addition, a flow diagram may include a “start” and/or “continue” indication. The “start” and “continue” indications reflect that the steps presented can optionally be incorporated in or otherwise used in conjunction with other routines. In this context, “start” indicates the beginning of the first step presented and may be preceded by other activities not specifically shown. Further, the “continue” indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) “operably coupled to”, “coupled to”, and/or “coupling” includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:

selecting, by a processing system including a processor, a feature from a plurality of features in a data set for generating a machine learning model, wherein:

the plurality of features are determined to potentially impact a target variable of the machine learning model, and the data set comprises feature values of the plurality of features associated with target variable values of the target variable;

dividing, by the processing system, a feature range of the feature into a plurality of subsets that span the feature range, wherein the feature range comprises a value range of the feature values for the feature from the data set;

calculating, by the processing system, an average target variable value from the target variable values associated with the feature values for each subset of the plurality of subsets, resulting in a plurality of average target variable values;

estimating, by the processing system, a measure of feature significance with respect to the target variable by determining a difference between a maximum average target variable value and a minimum average target variable value in the plurality of average target variable values; and generating the machine learning model using at least the feature based on the measure of feature significance indicating an impact on the target variable.

2. The method of claim 1, wherein the average target variable value comprises an arithmetic mean value.

3. The method of claim 1, wherein the average target variable value comprises a median value.

4. The method of claim 1, wherein the average target variable value comprises a mode value.

5. The method of claim 1, wherein the average target variable value comprises a mid-range value.

6. The method of claim 1, wherein the feature comprises a numeric feature, wherein the method further comprises determining, by the processing system, the feature range for the numeric feature based on a difference between maximum and minimum values of the numeric feature, wherein the dividing the feature range comprises splitting the feature range into a set of equal sub-intervals, and wherein the calculating the average target variable value for each subset of the plurality of subsets comprises calculating an average target variable value for each of the equal sub-intervals.

7. The method of claim 1, wherein the feature comprises a categorical feature, wherein the dividing the feature range comprises determining a list of unique categorical values, and wherein the calculating the average target variable value for each subset of the plurality of subsets comprises calculating an average target variable value for each of the unique categorical values.

8. The method of claim 1, wherein the feature comprises one or more of an integer feature or a logical feature.

9. The method of claim 1, wherein the machine learning model comprises a regression model.

10. A device, comprising:

a processing system including a processor; and a memory that stores executable instructions that, when executed by the processing system, facilitate performance of operations, the operations comprising:

determining a type of each feature of a plurality of features associated with a target variable in a data set for generating a machine learning model, wherein:

the plurality of features are determined to potentially impact a target variable of the machine learning model, and the data set comprises feature values of the plurality of features associated with target variable values of the target variable;

for each feature of the plurality of features, estimating a respective significance value for that feature, relative to the target variable, based on the type of that feature and the feature values and the target variable values of that feature, resulting in a plurality of respective significant values;

performing filtering of the plurality of features based on the plurality of respective significant values; and generating the machine learning model using a set of features that were filtered from the plurality of features.

11. The device of claim 10, wherein the machine learning model comprises a regression model or predictive model.

12. The device of claim 10, wherein the performing the filtering comprises sorting the plurality of respective significant values to identify the set of features from the plurality of features that each has a determined significant impact on the target variable.

13. The device of claim 10, wherein the performing the filtering comprises comparing the plurality of respective significant values with a threshold.

14. The device of claim 10, wherein the estimating the respective significance value involves calculation of arithmetic mean values.

15. The device of claim 10, wherein the estimating the respective significance value involves calculation of median values.

16. The device of claim 10, wherein the estimating the respective significance value involves calculation of mode values.

17. The device of claim 10, wherein the estimating the respective significance value involves calculation of mid-range values.

18. A non-transitory machine-readable medium, comprising executable instructions that, when executed by a processing system including a processor, facilitate performance of operations, the operations comprising:

identifying a plurality of subsets for a feature in a data set, wherein the data set comprises:

a plurality of features that are determined to potentially impact a target variable of the machine learning model, and feature values of the plurality of features associated with target variable values of the target variable;

determining an average target variable value from the target variable values associated with the feature for each subset of the plurality of subsets, resulting in a plurality of average target variable values;

calculating a difference between a maximum average target variable value and a minimum average target variable value in the plurality of average target variable values, wherein the difference corresponds to a measure of feature significance with respect to the target variable; and based on the measure of feature significance satisfying a threshold, utilizing the feature to construct a regression or predictive model.

19. The non-transitory machine-readable medium of claim 18, wherein the average target variable value comprises an arithmetic mean value, a median value, a mode value, or a mid-range value.

20. The non-transitory machine-readable medium of claim 18, wherein the feature comprises a numeric feature, a categorical feature, an integer feature, or a logical feature.

* * * * *